C. P. PRICE.
THEATRICAL APPLIANCE.
APPLICATION FILED APR. 3, 1914.
1,197,543.
Patented Sept. 5, 1916.
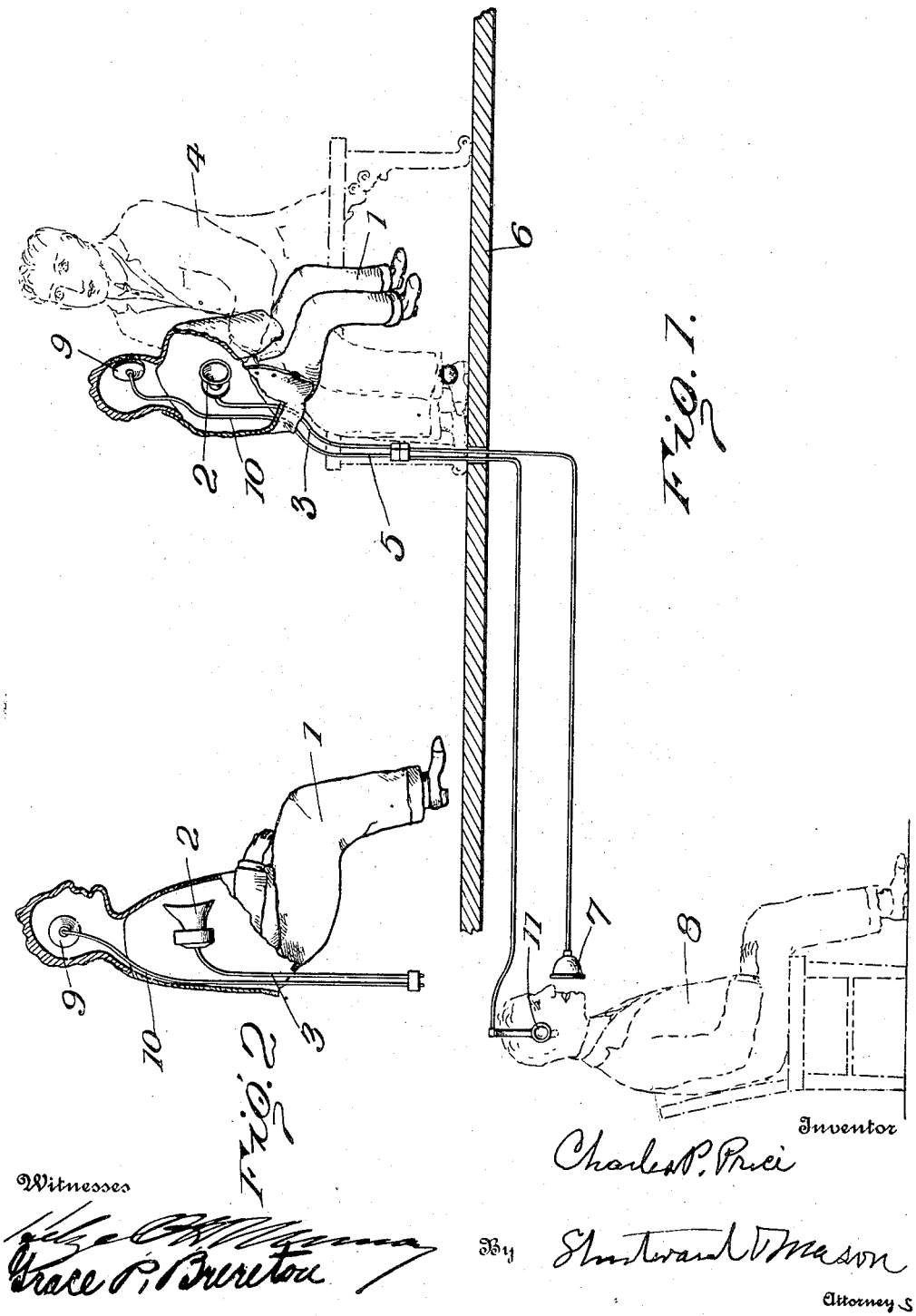

UNITED STATES PATENT OFFICE.

CHARLES P. PRICE, OF BOSTON, MASSACHUSETTS.

THEATRICAL APPLIANCE.

1,197,543.   Specification of Letters Patent.   Patented Sept. 5, 1916.

Application filed April 3, 1914. Serial No. 829,268.

*To all whom it may concern:*

Be it known that I, CHARLES P. PRICE, a citizen of the United States, residing at Boston, in the county of Suffolk, State of Massachusetts, have invented certain new and useful Improvements in Theatrical Appliances, of which the following is a description, reference being had to the accompanying drawing and to the figures of reference marked thereon.

The invention relates to new and useful improvements in theatrical appliances, and more particularly to appliances used in connection with speaking dummy figures.

An object of the invention is to provide a theatrical appliance whereby a dummy figure may be positioned within view of an audience and spoken words transmitted through the dummy figure to the audience by an assistant at some distant point, while the lips of the dummy figure may be manipulated by an operator holding the said figure.

In the drawings, which show by way of illustration one embodiment of the invention,—Figure 1 is a view showing more or less diagrammatically a dummy figure having my improvements applied thereto, and the connections leading to the assistant at a distant point; Fig. 2 is an enlarged view showing more clearly the dummy figure structure and the parts applied thereto.

The invention consists generally in providing a dummy figure with a receiver which is concealed in the body of the figure, so that it is not visible, and connections are led from this receiver to a distant point, where said connections are attached to an ordinary telephone transmitter, so that an assistant speaking in the transmitter will reproduce words in the receiver which give the effect of the dummy figure speaking. The dummy figure is also preferably provided with a transmitter for the operator, which is connected to a receiver which may be used by the assistant, so the assistant at a distant point may understand the words spoken by the operator and reply thereto through the receiver in the body of the figure.

Referring more in detail to the drawing, the dummy figure 1 is of the usual construction, representing a person, and located within the figure is a receiver 2, concealed in the body of said figure. The mouth of the receiver is preferably adjacent the front and directed so that the words reproduced by the receiver will be distinctly heard from all points in front of the figure. A connection 3 leads from the receiver 2. The operator indicated diagrammatically at 4 in Fig. 1, holds the dummy figure and the connections 3 are so disposed that they may be preferably laid through or in rear of the leg 5 of the seat of the operator. These connections extend through the floor of the platform or stage 6, and are attached to a transmitter 7, which is suitably placed for an assistant indicated diagrammatically at 8. The dummy figure is also provided with a transmitter 9, which is preferably placed in the head of the figure, so as to be close to the mouth of the operator. Connections 10 lead from this transmitter to a receiver 11, which may be used by the assistant indicated at 8.

The operator speaking into the transmitter 9, conveys to the assistant the question or words spoken, and the assistant speaking into the transmitter 7, answers the words or questions, and the words spoken into the transmitter 7 are reproduced by the receiver 2 and give the effect of the dummy figure replying to the spoken words of the operator.

The usual means may be provided for manipulating the lips of the dummy figure, if desired.

It is obvious that minor changes in the details of construction may be made, without departing from the spirit of the invention, as set forth in the appended claims.

Having thus described my invention, what I claim as new and desire to secure by Letters Patent, is:—

1. A theatrical appliance including in combination, a dummy figure, a receiver concealed in the body of the same, a transmitter located at a distant point from said figure, and connections between said transmitter and said receiver.

2. A theatrical appliance including in combination, a dummy figure, a receiver concealed in the body of the figure, a transmitter located and concealed in the figure, a receiver and a transmitter located at a distant point from the dummy figure, connections between the receiver at the distant point and the transmitter in the head of the dummy figure, and connections between the transmitter at the distant point and the receiver in the body of the dummy figure.

In testimony whereof, I affix my signature, in the presence of two witnesses.

CHARLES P. PRICE.

Witnesses:
 E. G. MASON,
 A. M. PARKINS.